(12) United States Patent
Chen et al.

(10) Patent No.: US 10,278,159 B2
(45) Date of Patent: Apr. 30, 2019

(54) METHOD FOR PREFORMING COMMUNICATIONS IN WIRELESS SOFTWARE DEFINED NETWORK AND APPARATUS THEREOF

(71) Applicant: Huawei Technologies Co., Ltd., Shenzhen (CN)

(72) Inventors: Xueliang Chen, Shenzhen (CN); Dan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 14/755,692

(22) Filed: Jun. 30, 2015

(65) Prior Publication Data

US 2015/0312894 A1 Oct. 29, 2015

Related U.S. Application Data

(63) Continuation of application No. PCT/CN2013/091116, filed on Dec. 31, 2013.

(30) Foreign Application Priority Data

Dec. 31, 2012 (CN) .......................... 2012 1 0590149

(51) Int. Cl.
*H04W 72/04* (2009.01)
*H04W 16/18* (2009.01)
(Continued)

(52) U.S. Cl.
CPC ......... *H04W 72/0406* (2013.01); *H04L 47/14* (2013.01); *H04W 16/18* (2013.01);
(Continued)

(58) Field of Classification Search
None
See application file for complete search history.

(56) References Cited

U.S. PATENT DOCUMENTS 7,738,876 B1 * 6/2010 Radhakrishnan ..... H04W 48/20
370/338
7,826,841 B2 11/2010 Lu et al.
(Continued)

FOREIGN PATENT DOCUMENTS

CN 101094144 A 12/2007
CN 102349268 A 2/2012
(Continued)

OTHER PUBLICATIONS

Kong, Weiwei, "Six Ways to Implement the Software Definition Network (SDN)," China High Speed Network, Oct. 26, 2012, 5 pages.
(Continued)

*Primary Examiner* — Mounir Moutaouakil
(74) *Attorney, Agent, or Firm* — Brinks Gilson & Lione

(57) ABSTRACT

The present invention discloses a method for performing communications in a wireless software defined network SDN and an apparatus thereof. The method includes: generating a message in a first format; and transmitting the message to a wireless network control device of a control plane, so that the wireless network control device obtains content in the message according to the first format. According to the method for performing communications in the wireless software defined network SDN and the apparatus thereof in embodiments of the present invention, the wireless network control device in the wireless SDN may perform communications with a base station and a user equipment by defining the message content and the message format for performing communications between the wireless network control device of the control plane and the base station as well as the user equipment of a data plane, thereby enhancing feasibility of a wireless SDN architecture.

30 Claims, 3 Drawing Sheets

A wireless network control device of a control plane generates a message in a first format — 210

Transmitting the message to a user equipment UE or a base station, so that the UE or the base station obtains content in the message according to the first format — 220

(51) Int. Cl.
  *H04L 12/801* (2013.01)
  *H04W 24/02* (2009.01)
  *H04W 88/02* (2009.01)
  *H04W 88/12* (2009.01)
  *H04W 88/06* (2009.01)

(52) U.S. Cl.
  CPC ............ *H04W 24/02* (2013.01); *H04W 88/02* (2013.01); *H04W 88/06* (2013.01); *H04W 88/12* (2013.01)

(56) References Cited

U.S. PATENT DOCUMENTS

| | | | | |
|---|---|---|---|---|
| 8,971,173 | B1* | 3/2015 | Choudhury | H04L 47/125 370/216 |
| 9,184,995 | B2* | 11/2015 | Leong | H04L 41/0823 |
| 2009/0298544 | A1 | 12/2009 | Karampuri | |
| 2010/0312897 | A1* | 12/2010 | Allen | H04L 12/1822 709/227 |
| 2011/0261825 | A1 | 10/2011 | Ichino | |
| 2012/0099862 | A1* | 4/2012 | Lin | H04J 3/1664 398/45 |
| 2012/0176331 | A1* | 7/2012 | Nakao | G06F 3/0362 345/173 |
| 2012/0300615 | A1 | 11/2012 | Kempf et al. | |
| 2013/0272135 | A1* | 10/2013 | Leong | H04L 41/0823 370/241 |
| 2014/0153390 | A1* | 6/2014 | Ishii | H04W 76/023 370/230 |

FOREIGN PATENT DOCUMENTS

| | | |
|---|---|---|
| CN | 102573072 A | 7/2012 |
| CN | 102594689 A | 7/2012 |

OTHER PUBLICATIONS

OpenFlow Switch Specification, Version 1.3.1 (Wire Protocol 0x04), Open Networking Foundation, Sep. 6, 2012, 128 pages.

* cited by examiner

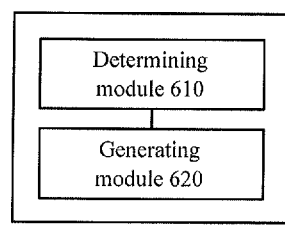
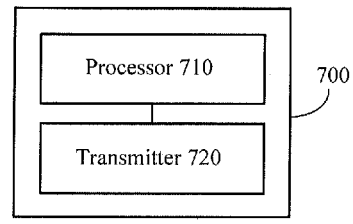
FIG. 8　　　　　　　　　FIG. 9
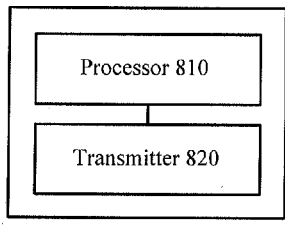
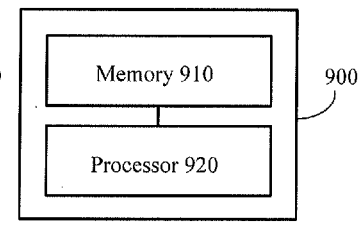
FIG. 10　　　　　　　　FIG. 11

METHOD FOR PREFORMING COMMUNICATIONS IN WIRELESS SOFTWARE DEFINED NETWORK AND APPARATUS THEREOF

CROSS-REFERENCE TO RELATED APPLICATIONS

This application is a continuation of International Application No. PCT/CN2013/091116, filed on Dec. 31, 2013, which claims priority to Chinese Patent Application No. 201210590149.0, filed on Dec. 31, 2012, both of which are hereby incorporated by reference in their entireties.

TECHNICAL FIELD

Embodiments of the present invention relate to the field of communications and, in particular, to a method for performing communications in a wireless software defined network and an apparatus thereof.

BACKGROUND

A software-defined network (Software-Defined Network, "SDN" for short) is a new network architecture proposed by Stanford University, and since firmware of a traditional network device (a switch, a router) is locked and controlled by a device manufacturer, so the SDN hopes to separate network control from physical network topology, thereby getting rid of restrictions of hardware to the network architecture. Thus, an enterprise may modify the network architecture just like upgrading and installing software, so that a requirement such as adjustment, expansion or upgrading of the enterprise to an entire website architecture is satisfied. Hardware such as a switch and a router at a bottom layer then does not need to be replaced, thus, while a great number of costs is saved, a network architecture iteration cycle will be shorted greatly. A core idea of the SDN is to separate control from bear, and a control plane is separated by separating a data plane of a network from the control plane, thus forming a centralized control plane. In many solutions regarding a wired network, openflow Openflow is recognized as a popular technique to realize the SDN, and the OpenFlow realizes flexible control of network traffic by separating a control plane of a network device from a data plane, thereby providing a favorable platform for network and application innovation.

With development of the SDN in a wired network system, Stanford University also considers about introducing the idea of the SDN to an existing wireless network system, and forming a wireless network operation system (Operation System, "OS" for short) by making a control plane of a base station device of the wireless network independence. A traditional base station is degenerated to a base station device with a single function, and the wireless OS becomes a control center of the network to control behaviors of base station devices at lower levels. However, in data that have been disclosed by Stanford University, a wireless network control device and a control interface of a base station have not been described in detail yet. An existing Openflow protocol only targets at control of devices such as a switch and a router, which does not perform abstraction of and define control of wireless air-interface resources according to features of a wireless base station, and thus is not suitable to be taken as a control message between a wireless network control device of a control plane and a base station device of a data plane under the wireless SDN architecture. So far, there hasn't been any protocol for an interface message format and message content between a wireless network control device of a control plane and a base station and a user equipment of a data plane, and communications between the wireless network control device and the base station as well as the user equipment cannot be performed. Therefore, a technical problem that the present invention aims to solve is how to perform abstraction of and define an interface message format between a wireless network control device and a base station and a user equipment under a wireless SDN architecture, thereby realizing communications between the wireless network control device and the base station as well as the user equipment.

SUMMARY

Embodiments of the present invention provide a method for performing communications in a wireless software-defined network SDN and an apparatus thereof, which define message content and a message format of communications between a wireless network control device of a control plane and a base station and a user equipment of a data plane.

In a first aspect, embodiments of the present invention provide a method for performing communications in a wireless software defined network SDN, the method includes: generating a message in a first format; and transmitting the message to a wireless network control device of a control plane, so that the wireless network control device obtains content in the message according to the first format.

With reference to the first aspect, in a first possible implementation, the first format is an extensible markup language XML format.

With reference to the first possible implementation of the first aspect, in a second possible implementation, the message includes a head node and a body node; the head node includes a version element and a message type element, where the version element indicates a protocol version of the message, and the message type element indicates a type of the message; the body node includes the content corresponding to the type of the message.

With reference to the first aspect or with reference to the first or the second possible implementation of the first aspect, in a third possible implementation, the content includes information reported by a user equipment UE or a base station to the wireless network control device, or an operation that a UE requests the wireless network control device to perform.

With reference to the third possible implementation of the first aspect, in a fourth possible implementation, the information reported by the base station to the wireless network control device includes at least one of the followings: cell establishment information, cell delete information, cell activation information, cell deactivation information, cell load information, cell serving UE list information, base station surrounding wireless environment information and cell traffic information.

With reference to the third or the fourth possible implementation of the first aspect, in a fifth possible implementation, the information reported by the UE to the wireless network control device includes at least one of the followings: access information of the UE, delete bearer information of the UE, channel quality information of the UE, capability information of the UE, location information of the UE and quality of service Qos information of the UE; the operation that the UE requests the wireless network control device to perform includes at least one of the following operations: modifying a service bandwidth of the UE and modifying a service delay of the UE.

With reference to any possible implementation of the second to the fifth possible implementations of the first aspect, in a sixth possible implementation, the body node includes an uplink node, and the uplink node indicates that the message is a message transmitted by the user equipment or the base station to the wireless network control device.

In a second aspect, embodiments of the present invention provide a method for performing communications in a wireless software defined network SDN, the method includes: generating, by a wireless network control device of a control plane, a message in a first format; and transmitting the message to a user equipment UE or a base station, so that the UE or the base station obtains content in the message according to the first format.

With reference to the second aspect, in a first possible implementation, the first format is an extensible markup language XML format.

With reference to the first possible implementation of the second aspect, in a second possible implementation, the message includes a head node and a body node; the head node includes a version element and a message type element, where the version element indicates a protocol version of the message, and the message type element indicates a type of the message; the body node includes the content corresponding to the type of the message.

With reference to the second aspect or with reference to the first or the second possible implementation of the second aspect, in a third possible implementation, the content includes an operation that the wireless network control device instructs the UE or instructs the base station to perform, or includes information issued by the wireless network control device to the UE or the base station.

With reference to the third possible implementation of the second aspect, in a fourth possible implementation, the operation that the wireless network control device instructs the base station to perform includes at least one of the following operations: quality of service Qos priority control, service bandwidth control, service delay control, access control, mobility control, multi-standard offload control, cell handover control, scheduling priority control, UE service charging control, use spectral control by the base station and virtualization; the operation that the wireless network control device instructs the UE to perform includes at least one of the following operations: multi-standard access control, handover control, offload control and virtualization.

With reference to the third or the fourth possible implementation of the second aspect, in a fifth possible implementation, the information issued by the wireless network control device to the base station includes at least one of the followings: location information of other base station or radio access point AP surrounding the base station, load information of other base station or radio AP surrounding the base station, wireless environment available white spectrum resource information and load information of the wireless network control device; the information issued by the wireless network control device to the UE includes at least one of the followings: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

With reference to any possible implementation of the second to the fifth possible implementations of the second aspect, in a sixth possible implementation, the body node includes a downlink node, and the downlink node indicates that the message is a message transmitted by the wireless network control device to the UE or the base station.

In a third aspect, embodiments of the present invention provide a method for performing communications in a wireless software defined network SDN, the method includes: determining an extensible markup language XML message format supported by a wireless network control device of a control plane; and generating an XML message according to the XML message format.

With reference to a third aspect, in a first possible implementation, the XML message format includes a root node, a head node and a body node; the head node includes a version element and a message type element, where the version element indicates a protocol version of the message, and the message type element indicates a type of the message; the body node includes content corresponding to the type of the message.

With reference to the first possible implementation of the third aspect, in a second possible implementation, the body node includes an uplink node and a downlink node, the uplink node indicates that the XML message is a message transmitted by a user equipment or a base station to the wireless network control device, and the downlink node indicates that the XML message is a message transmitted by the wireless network control device to the UE or the base station.

With reference to the second possible implementation of the third aspect, in a third possible implementation, the uplink node includes information reported by the UE to the wireless network control device, information reported by the base station to the wireless network control device, and control information performed by the UE to the wireless network control device; the downlink node includes control information performed by the wireless network control device to the base station, control information performed by the wireless network control device to the UE, information issued by the wireless network control device to the base station and information issued by the wireless network control device to the UE.

In a fourth aspect, embodiments of the present invention provide a base station or a user equipment UE, the base station or the UE includes: a generating module, configured to generate a message in a first format; and a transmitting module, configured to transmit the message generated by the generating module to a wireless network control device of a control plane, so that the wireless network control device obtains content in the message according to the first format.

With reference to the fourth aspect, in a first possible implementation, the first format is an extensible markup language XML format.

With reference to the first possible implementation of the fourth aspect, in a second possible implementation, the message includes a head node and a body node; the head node includes a version element and a message type element, where the version element indicates a protocol version of the message, and the message type element indicates a type of the message; the body node includes the content corresponding to the type of the message.

With reference to the fourth aspect or with reference to the first or the second possible implementation of the fourth aspect, in a third possible implementation, the content includes information reported by the UE or the base station to the wireless network control device, or an operation that the UE requests the wireless network control device to perform.

With reference to the third possible implementation of the fourth aspect, in a fourth possible implementation, the information reported by the base station to the wireless network control device includes at least one of the followings: cell establishment information, cell delete information, cell activation information, cell deactivation information, cell load information, cell serving UE list information, base station surrounding wireless environment information and cell traffic information.

With reference to the third or the fourth possible implementation of the fourth aspect, in a fifth possible implementation, the information reported by the UE to the wireless network control device includes at least one of the followings: access information of the UE, delete bearer information of the UE, channel quality information of the UE, capability information of the UE, location information of the UE and quality of service Qos information of the UE; the operation that the UE requests the wireless network control device to perform includes at least one of the following operations: modifying a service bandwidth of the UE and modifying a service delay of the UE.

With reference to any possible implementation of the second to the fifth possible implementations of the fourth aspect, in a sixth possible implementation, the body node includes an uplink node, and the uplink node indicates that the message is a message transmitted by the user equipment or the base station to the wireless network control device.

In a fifth aspect, embodiments of the present invention provide a wireless network control device of a control plane, the wireless network control device includes: a generating module, configured to generate a message in a first format; and a transmitting module, configured to transmit the message generated by the generating module to a user equipment UE or a base station, so that the UE or the base station obtains content in the message according to the first format.

With reference to the fifth aspect, in a first possible implementation, the first format is an extensible markup language XML format.

With reference to the first possible implementation of the fifth aspect, in a second possible implementation, the message includes a head node and a body node; the head node includes a version element and a message type element, where the version element indicates a protocol version of the message, and the message type element indicates a type of the message; the body node includes the content corresponding to the type of the message.

With reference to the fifth aspect or with reference to the first or the second possible implementation of the fifth aspect, in a third possible implementation, the content includes an operation that the wireless network control device instructs the UE or instructs the base station to perform, or includes information issued by the wireless network control device to the UE or the base station.

With reference to the third possible implementation of the fifth aspect, in a fourth possible implementation, the operation that the wireless network control device instructs the base station to perform includes at least one of the following operations: quality of service Qos priority control, service bandwidth control, service delay control, access control, mobility control, multi-standard offload control, cell handover control, scheduling priority control, UE service charging control, use spectral control by the base station and virtualization; the operation that the wireless network control device instructs the UE to perform includes at least one of the following operations: multi-standard access control, handover control, offload control and virtualization.

With reference to the third or the fourth possible implementation of the fifth aspect, in a fifth possible implementation, the information issued by the wireless network control device to the base station includes at least one of the followings: location information of other base station or radio access point AP surrounding the base station, load information of other base station or radio AP surrounding the base station, wireless environment available white spectrum resource information and load information of the wireless network control device; the information issued by the wireless network control device to the UE includes at least one of the followings: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

With reference to any possible implementation of the second to the fifth possible implementations of the fifth aspect, in a sixth possible implementation, the body node includes a downlink node, and the downlink node indicates that the message is a message transmitted by the wireless network control device to the UE or the base station.

In a sixth aspect, embodiments of the present invention provide a communication apparatus, and the communication apparatus includes: a determining module, configured to determine an extensible markup language XML message format supported by a wireless network device of a control plane; and a generating module, configured to generate an XML message according to the XML message format determined by the determining module.

With reference to the sixth aspect, in a first possible implementation, the XML message format includes a root node, a head node and a body node; the head node includes a version element and a message type element, where the version element indicates a protocol version of the message, and the message type element indicates a type of the message; the body node includes content corresponding to the type of the message.

With reference to the first possible implementation of the sixth aspect, in a second possible implementation, the body node includes an uplink node and a downlink node, the uplink node indicates that the XML message is a message transmitted by a user equipment or a base station to the wireless network control device, and the downlink node indicates that the XML message is a message transmitted by the wireless network control device to the UE or the base station.

With reference to the second possible implementation of the sixth aspect, in a third possible implementation, the uplink node includes information reported by the UE to the wireless network control device, information reported by the base station to the wireless network control device, and control information performed by the UE to the wireless network control device; the downlink node includes control information performed by the wireless network control device to the base station, control information performed by the wireless network control device to the UE, information issued by the wireless network control device to the base station and information issued by the wireless network control device to the UE.

Based on the above technical solutions, according to a method for performing communications in a wireless SDN and an apparatus thereof in embodiments of the present invention, by defining message content and a message format used for communications between the wireless network control device of a control plane and a base station as well as a user equipment of a data plane, communications may be performed between the wireless network control device and the base station as well as the user equipment in the wireless SDN, thereby enhancing feasibility of the wireless SDN architecture.

BRIEF DESCRIPTION OF DRAWINGS

In order to make technical solutions of embodiments of the present invention clearer, accompanying drawings used for description of embodiments of the present invention or the prior art are briefly described hereunder. Obviously, the described drawings as follows are merely some embodiments of present invention. For persons skilled in the art, other drawings may be obtained based on these drawings without any creative effort.

FIG. 8 is a schematic block diagram of a communication apparatus according to an embodiment of the present invention.

FIG. 9 is a schematic block diagram of a base station or a user equipment according to another embodiment of the present invention.

FIG. 10 is a schematic block diagram of a wireless network control device of a control plane according to another embodiment of the present invention.

FIG. 11 is a schematic block diagram of a communication apparatus according to another embodiment of the present invention.

DESCRIPTION OF EMBODIMENTS

Figure 1:
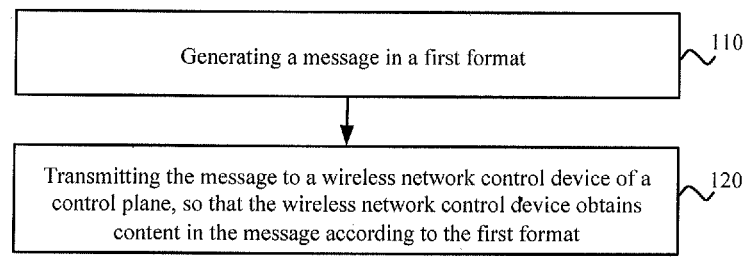
FIG. 1 is a schematic flow chart of a method for performing communications in a wireless software defined network SDN according to an embodiment of the present invention.

Technical solutions in embodiments of the present invention are hereinafter described clearly and completely with reference to accompanying drawings in embodiments of the present invention. Obviously, the described embodiments are only a part of embodiments of the present invention, rather than all embodiments of the present invention. All other embodiments obtained by persons of ordinary skill in the art based on embodiments of the present invention without any creative efforts shall fall within the protection scope of the present invention.

It should be understood that, the technical solutions of embodiments of the present invention may be applied in various wireless software defined network SDN architectures, such as an openradio Openradio architecture. And the wireless SDN architecture may be applied in existing communication systems, for instance, a global system of mobile communication (Global System of Mobile communication, "GSM" for short) system, a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short), a long term evolution, (Long Term Evolution, "LTE" for short) system, an LTE frequency division duplex (Frequency Division Duplex, "FDD" for short) system, an LTE time division duplex (Time Division Duplex, "TDD" for short), a universal mobile telecommunication system (Universal Mobile Telecommunication System, "UMTS" for short), a worldwide interoperability for microwave access (Worldwide Interoperability for Microwave Access, "WiMAX" for short) communication system, etc.

It should also be understood that, in embodiments of the present invention, a user equipment (User Equipment, "UE" for short) may be called as a terminal (Terminal), a mobile station (Mobile Station, "MS" for short), a mobile terminal (Mobile Terminal), etc, the user equipment may communicate with one or a plurality of core networks via a radio access network (Radio Access Network, "RAN" for short), for instance, the user equipment may be a mobile phone (or referred to as a "cellular" phone), a computer with a mobile terminal, etc, for instance, the user equipment may also be a portable, a pocket-size, a handheld, a computer built-in or a vehicle-mounted mobile device, and they exchange voice and/or data with the radio access network.

It should also be understood that, in embodiments of the present invention, a base station may be a base station in various communication systems based on a wireless SDN architecture, and the base station is only responsible for communications in a data plane, for instance, which may be a base station (Base Transceiver Station, "BTS" for short) in the GSM or the CDMA, may also be a base station (NodeB) in the WCDMA, may also be an evolved base station (evolved Node B, "eNB" or "e-NodeB" for short) in the LTE, may also be an access point (Access Point, "AP" for short) in wireless fidelity Wifi, may also be a user equipment having a network device function, and may also be another name for an access network, such as an evolved universal terrestrial radio access network (Evolved Universal Terrestrial Radio Access Network, "E-UTRAN" for short) and a universal terrestrial radio access network (Universal Terrestrial Radio Access Network, "UTRAN" for short), embodiments of the present invention are not limited to thereto.

It should also be understood that, in embodiments of the present invention, a control plane of a communication system based on a wireless SDN architecture is took charge of by a wireless network control device, the wireless network control device is piled with control functions of radio access networks (Radio Access Network, "RAN" for short) of various radio access type, these logical control functions include but are not limited to radio resource management (Radio Resource Management, "RRM" for short), control of data routing of a base station, in addition, the wireless network control device may also control a radio access terminal via the RAN, including controlling a wireless terminal to load a base station of a corresponding standard, the wireless network control device should be determined according to a function and internal logic thereof, and should not make a limitation to the protection scope of embodiments of the present invention.

FIG. 1 is a schematic flow chart of a method 100 for performing communications in a wireless software defined network SDN according to an embodiment of the present invention, the method 100 may be implemented by any proper apparatus which perform communications with a wireless network control device of a control plane in the wireless SDN, for instance, may be implemented by a user equipment, or implemented by a base station, embodiments of the present invention are not limited thereto. For the convenience of description, an example is taken where the embodiments hereunder are implemented by the user equipment or the base station. As shown in FIG. 1, the method 100 includes:

S110, generating a message in a first format;

S120, transmitting the message to a wireless network control device of a control plane, so that the wireless network control device obtains content in the message according to the first format.

Thus, according to a method for performing communications in a wireless SDN in embodiments of the present invention, message content and a message format for performing communications between a wireless network control device of a control plane and a base station as well as a user equipment of a data plane are defined, so that the wireless network control device in the wireless SDN may perform communications with the base station and the user equipment, thereby enhancing feasibility of a wireless SDN architecture.

In embodiments of the present invention, a wireless network control device, a UE and a base station side may pre-negotiate to determine a first format for communications therebetween, the UE or the base station generates a message in the first format, and transmits the message to the wireless network control device, after receiving the message, the wireless network control device processes the message according to the first format to obtain content in the message, so that control to the base station or the UE may be performed according to the content. Similarly, the wireless network control device may also generate a message in the first format and transmit the message to the base station or the UE, the base station or the UE may process the message according to the first format so as to obtain content carried in the message, thereby realizing communications between the wireless network control device and the UE as well as the base station.

Optionally, the first format may be a binary format, and may also be an extensible markup language (eXtensible Markup Language, "XML" for short), embodiments of the present invention are not limited thereto. Compared with other formats, a text-based XML format has a more easily understandable advantage.

When the first format is the XML format, a message for the base station or the UE and the wireless network control device to perform communications may include a message header portion and a message body portion, where the message header portion includes a head node, which is configured to indicate some basic information of the message, such as a protocol version, a message length, a message type, etc; the message body portion includes a body node, which is configured to carry specific content, for instance, the message transmitted by the base station or the UE to the wireless network control device may carry an operation that the UE requests the wireless network control device to perform, or carries information reported by the UE or the base station to the wireless network control device, similarly, the message transmitted by the wireless network control device to the UE or the base station may carry an operation that the wireless network control device instructs the UE or the base station to perform, or carries information issued by the wireless network control device to the UE or the base station. For the sake of a syntax requirement of the XML format, the head node and the body node may be encapsulated in a root node so as to ensure equivalence of the head node and the body node, but embodiments of the present invention are not limited thereto.

Optionally, the message includes a head node and a body node; the head node includes a version element and a message type element, where the version element indicates a protocol version of the message, and the message type element indicates a type of the message; the body node includes the content corresponding to the type of the message.

Optionally, the version element may be indicated as <version>value1</version>, a value thereof value 1 indicates which protocol version the message belongs to. Optionally, the message type element may be indicated as <Message type>value2</Message type>, a value thereof value 2 indicates which type the message belongs to. For instance, the value2 is 0, indicating that the message is a modifying user bearer bandwidth control message transmitted by the wireless network control device to the base station, the value2 is 20, indicating that the message is a modifying user bearer bandwidth success response message transmitted by the base station to the wireless network control device; the value2 is 5, indicating that the message is a reporting UE capability control message transmitted by the wireless network control device to the UE, the value2 is 6, indicating that the message is a reported UE capability message transmitted by the UE to the wireless network control device, etc. Optionally, a corresponding relationship between a type value and a message type of the message described above may be configured dynamically, a version element and a message type element may also be indicated using other manners, and embodiments of the present invention are not limited thereto.

Optionally, in embodiments of the present invention, a wireless network control device, a UE and a base station side may pre-negotiate to determine an XML message format for communications therebetween, that is, a template of the XML format of the message, and prestore a corresponding relationship between a type of the message and a format of the message body portion. Optionally, when the XML message format has different protocol versions, the wireless network control device, the UE and the base station side may also store a corresponding relationship between the protocol versions and the XML message format, the corresponding relationship may include a corresponding relationship between a message type value and a format of the message body portion in different protocol versions, but embodiments of the present invention are not limited thereto.

When receiving a message in the XML format transmitted by the UE or the base station, the wireless network control device may determine a protocol version used by the message via a version element included in a head node of the message, thereby determining a corresponding relationship between a message type value and a format of the message body portion under this protocol version, and obtaining a format of the message body portion of the message by searching the format of the message body portion corresponding to a message type value in the message type element; then, the wireless network control device may process the message according to the format to obtain content of the message body portion of the message. Similarly, after receiving a message transmitted by the wireless network control device, the UE or the base station can also execute the above operation to obtain content of the message, but embodiments of the present invention are not limited thereto.

Optionally, in embodiments of the present invention, the content of the message body portion of the message transmitted by the UE or the base station to the wireless network control device may include information reported by the user equipment UE or the base station to the wireless network control device, and may also include an operation that the UE requests the wireless network control device to perform. Similarly, the content of the message body portion of the message transmitted by the wireless network control device to the UE or the base station may include an operation that the wireless network control device instructs the UE or the base station to perform, and may also include information issued by the wireless network control device to the UE or the base station. For instance, a message type element of a message indicates that the message is quality of service (Quality of service, "Qos" for short) control message transmitted by the wireless network control device to the base station, and then content of a body node included in the message is content related to the Qos control.

In embodiments of the present invention, according to a category of content carried in the message, the message communicated between the wireless network control device and the base station as well as the UE may be divided into a notification type message and a control type message. The control type message is configured to request or instruct a receiving end to perform an operation, and the notification type message is configured to notify the receiving end of some information. Specifically, the control type message may include a control message performed by the wireless network control device to the base station, a control message performed by the wireless network control device to the UE and a control message performed by the UE to the wireless network control device; the notification type message may include a notification message performed by the base station to the wireless network control device, a notification message performed by the UE to the wireless network control device, a notification message performed by the wireless network control device to the base station and a notification message performed by the wireless network control device to the UE.

Optionally, the control message performed by the wireless network control device to the base station may include but not limited to the followings: a Qos control message, a scheduling priority control message, a UE bearer modify control message, a bandwidth control message, a delay control message, an access control message, a mobility control message, a multi-standard offload control message, a cell switch control message, a virtualization message, a base station scheduling priority control message, a UE service charging control message and a base station-used spectral control message. The Qos control message is configured to instruct the base station to adjust a service priority of the UE, the scheduling priority control message is configured to instruct the base station to adjust a priority scheduled by the UE on an air-interface, the UE bearer modify control message is configured to instruct the base station to modify a bearer of the UE, such as to modify a bearer bandwidth of the UE, the delay control message is configured to instruct the base station to modify a service delay of the UE, the access control message is configured to instruct the base station to allow which UEs to access, the mobility control message is configured to instruct the base station how to perform mobility management, such as manage a handover of the UE, the multi-standard offload control message is configured to instruct the base station to shunt service traffic of UEs accessing to a plurality of wireless networks to access points of a plurality of mobile networks, the virtualization message is configured to instruct the base station to generate a virtual base station of a specified standard, the UE service charging control message is configured to instruct the base station to modify service charging information of the UE, and the base station-used spectral control message is configured to instruct the base station to use a new spectral resource, but embodiments of the present invention are not limited thereto.

Optionally, the control message performed by the wireless network control device to the UE may include but not limited to the followings: a multi-standard access control message, a switch control message, an access control message, a offload control message and a virtualization message. The multi-standard access control message is configured to instruct the UE to access to a certain type of standard, such as open or close a WIFI, the switch control message is configured to instruct the UE to switch to which cell, for instance, control the UE to switch from an LTE to a GSM, the access control message is configured to instruct the UE to access to which cell, the offload control message is configured to instruct the UE to access to a plurality of wireless networks, and the virtualization message is configured to instruct the UE to generate a UE of a wireless standard or instruct the UE to generate a virtual base station, but embodiments of the present invention are not limited thereto.

Optionally, the control message performed by the UE to the wireless network control device may include but not limited to the followings: a service bandwidth modify control message and a service delay modify control message. The service bandwidth modify control message is configured to request the wireless network control device to modify a service bandwidth of the UE, and the service delay modify control message is configured to request the wireless network control device to modify a service delay of the UE, but embodiments of the present invention are not limited thereto.

For the notification type message, optionally, the notification message performed by the base station to the wireless network control device may include but not limited to the followings: a cell establish reporting message, a cell delete reporting message, a cell activation reporting message, a cell deactivation reporting message, a cell load reporting message, a traffic reporting message, a cell serving UE list reporting message, a cell handover drop call rate reporting message and a base station surrounding wireless environment reporting message. The cell establish reporting message is configured to report information of a newly established cell, such as cell ID etc., the cell delete reporting message is configured to report information of a deleted cell, the cell activation reporting message is configured to report information of an activated cell, the cell deactivation reporting message is configured to report information of a deactivated cell, the cell serving UE list reporting message is configured to report a served UE list, such as IDs of UEs and amount of UEs, the cell handover drop call rate reporting message is configured to report a drop call rate of cell handover, and the base station surrounding wireless environment reporting message is configured to report usage of a radio AP and a wireless spectral resource surrounding the base station, but embodiments of the present invention are not limited thereto.

Optionally, the notification message performed by the UE to the wireless network control device may include but not limited to the followings: a UE access reporting message, a UE delete bearer reporting message, a UE network withdrawn reporting message, a UE channel quality reporting message, a UE capability reporting message, a UE location reporting message, a UE service bandwidth reporting message and a Qos reporting message. The UE access reporting message is configured to report information of a cell which the UE accesses to, the UE delete bearer reporting message is configured to report information of a bearer which the UE deletes; the UE network withdrawn reporting message is configured to report information of a network which the UE withdraws, the UE capability reporting message is configured to report a wireless standard supported by the UE, power of the UE and a screen of the UE, and the Qos reporting message is configured to report service experience which the UE uses actually, but embodiments of the present invention are not limited thereto.

Optionally, the notification message performed by the wireless network control device to the base station may include but not limited to the followings: a surrounding base station or a radio access point (Access Point, "AP" for short) location notification message, a surrounding base station or a radio AP load notification message, a wireless environment available white spectral resource notification message and a wireless network control device load notification message. The surrounding base station or the radio AP location notification message and the surrounding base station or the radio AP load notification message are respectively configured to issue location information and load information of other base station or radio AP surrounding a base station to the base station, the wireless environment available white spectral resource notification message is configured to issue available white spectral resource information in wireless environment surrounding the base station to the base station, and the wireless network control device load notification message is configured to issue load status information of the wireless network control device to the base station, but embodiments of the present invention are not limited thereto.

Optionally, the notification message performed by the wireless network control device to the UE may include but not limited to the followings: a surrounding radio AP distribution notification message, a surrounding radio AP load notification message, a radio interference notification message, a surrounding UE distribution notification message, a surrounding UE status notification message and an adjacent cell notification message. The surrounding radio AP distribution notification message and the surrounding radio AP load notification message are respectively configured to issue distribution information and load information of a radio AP surrounding the UE, the radio interference notification message is configured to indicate radio interference information surrounding the UE, the surrounding UE distribution notification message and the surrounding UE status notification message are respectively configured to issue distribution information and status information of other UEs surrounding the UE, and the adjacent cell notification message is configured to issue adjacent cell information of the UE, but embodiments of the present invention are not limited thereto.

In summary, optionally, the information reported by the base station to the wireless network control device includes at least one of the followings: cell establishment information, cell delete information, cell activation information, cell deactivation information, cell load information, cell serving UE list information, base station surrounding wireless environment information and cell traffic information.

Optionally, the information reported by the UE to the wireless network control device includes at least one of the followings: access information of the UE, delete bearer information of the UE, channel quality information of the UE, capability information of the UE, location information of the UE and quality of service Qos information of the UE.

Optionally, the operation that the UE requests the wireless network control device to perform includes at least one of the following operations: modifying a service bandwidth of the UE and modifying a service delay of the UE.

Optionally, according to a transmitting end and a receiving end of a message, the above notification type message and the control type message may also be divided to an uplink message and a downlink message, where, the uplink message may include a notification message performed by the base station to the wireless network control device and a notification performed by the UE to the wireless network control device, and a control message performed by the UE to the wireless network control device; the downlink message may include a control message performed by the wireless network control device to the base station, a control message performed by the wireless network control device to the UE, a notification message performed by the wireless network control device to the base station and a notification message performed by the wireless network control device to the UE, but embodiments of the present invention are not limited thereto.

In order to indicate more clearly that the message belongs to an uplink message so as to make it more convenient for the wireless network control device to obtain content in the message, the body node of the message may include an uplink node, the uplink node indicates that the XML message is a message transmitted by the UE or the base station to the wireless network control device. The information reported by the UE or the base station to the wireless network control device or the operation that the UE requests the wireless network control device to perform may be encapsulated within the uplink node, and the uplink node and the information or the instructed operation which are encapsulated within the uplink node form content of the entire body node. Similarly, the body node of the message transmitted by the wireless network control device to the base station or the UE may include a downlink node, the downlink node indicates that the XML message is a message transmitted by the wireless network control device to the UE or the base station, but embodiments of the present invention are not limited thereto.

According to embodiments of the present invention, the XML message format of the XML message communicated between the wireless network control device and the base station as well as the user equipment may include a root node <root>, a head node <head> and a body node <body>; the head node may include a version element and a message type element, a value in the version element and the message type element is greater than or equal to zero, and is a character type; the body node may include an uplink node <uplink> and a downlink node <downlink>, where, the uplink node indicates that the XML message is a message transmitted by the user equipment or the base station to the wireless network control device, the uplink node may include information reported by the base station or the UE to the wireless network control device and an operation that the UE requests the wireless network control device to perform, for instance, a <CellEstablish_report> value3 </CellEstablish_report> element is configured to report information of an established cell, a <UECapability_report> value4 </UECapability_report> element is configured to report capability information of the UE, a <UEBandwidthBoosting> value5 </UEBandwidthBoosting> element is configured to instruct to modify a bearer bandwidth of the UE, etc.; the downlink node indicates that the XML message is a message transmitted by the wireless network control device to the UE or the base station, the downlink node may include an operation that the wireless network control device instructs the UE or the base station to perform and information issued by the wireless network control device to the UE or the base station, for instance, a <modify_UEQOS> value6</modify_UEQOS> element is configured to instruct the base station to modify service Qos of the UE, an <APLoad>-1</APLoad> element is configured to instruct the base station to report load information of an AP of surrounding WIFI, but embodiments of the present invention are not limited thereto.

Thus, according to a method for performing communications in a wireless SDN in embodiments of the present invention, message content and a message format for performing communications between a wireless network control device of a control plane and a base station as well as a user equipment of a data plane are defined, so that the wireless network control device in the wireless SDN may perform communications with the base station and the user equipment, thereby enhancing feasibility of a wireless SDN architecture.

Figure 2:
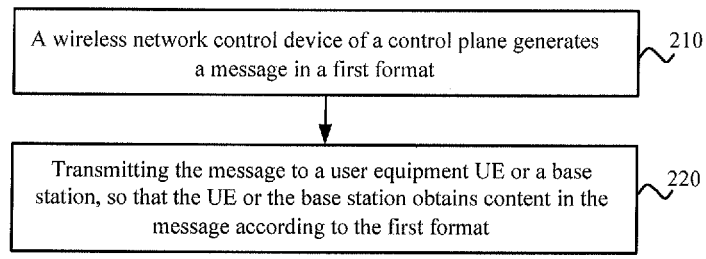
FIG. 2 is a schematic flow chart of a method for performing communications in a wireless SDN according to another embodiment of the present invention.

With reference to FIG. 1, the context above describes in detail about a method for performing communication in a wireless SDN according to embodiments of the present invention from the perspective of a base station or a UE, with reference to FIG. 2 hereunder, a method for performing communications in a wireless SDN according to embodiments of the present invention is described from the perspective of a wireless network control device of a control plane.

FIG. 2 is a schematic flow chart of a method 200 for performing communications in a wireless SDN according to another embodiment of the present invention. As shown in FIG. 2, the method 200 includes:

S210, a wireless network control device of a control plane generates a message in a first format;

S220, transmitting the message to a user equipment UE or a base station, so that the UE or the base station obtains content in the message according to the first format.

Thus, according to the method for performing communications in a wireless SDN in the embodiment of the present invention, message content and a message format for performing communications between a wireless network control device of a control plane and a base station as well as a user equipment of a data plane are defined, so that the wireless network control device in the wireless SDN may perform communications with the base station and the user equipment, thereby enhancing feasibility of a wireless SDN architecture.

Optionally, in embodiments of the present invention, a wireless network control device, a UE and a base station side may pre-negotiate to determine a first format for communications therebetween, the first format may be a binary format, and may also be an XML format, embodiments of the present invention are not limited thereto.

When the first format is the XML format, the message may include a head node and a body node; the head node includes a version element and a message type element, the version element indicates a protocol version of the message, the message type element indicates a type of the message; the body node includes content corresponding to the type of the message.

Optionally, the content includes an operation that the wireless network control device instructs the UE or instructs the base station to perform, or includes information issued by the wireless network control device to the UE or the base station.

Optionally, the operation that the wireless network control device instructs the base station to perform includes at least one of the following operations: quality of service Qos priority control, service bandwidth control, service delay control, access control, mobility control, multi-standard offload control, cell handover control, scheduling priority control, UE service charging control, use spectral control by the base station and virtualization;

The operation that the wireless network control device instructs the UE to perform includes at least one of the following operations: multi-standard access control, handover control, offload control and virtualization.

Optionally, as another embodiment, the information issued by the wireless network control device to the base station includes at least one of the followings: location information of other base station or radio access point AP surrounding the base station, load information of other base station or radio AP surrounding the base station, wireless environment available white spectrum resource information and load information of the wireless network control device;

The information issued by the wireless network control device to the UE includes at least one of the followings: distribution information of a radio AP surrounding the UE, load information of the radio AP surrounding the UE, wireless interference information surrounding the UE, distribution information of other UEs surrounding the UE, status information of other UEs surrounding the UE and adjacent cell information, but embodiments of the present invention are not limited thereto.

Optionally, the body node includes a downlink node, and the downlink node indicates that the message is a message transmitted by the wireless network control device to the UE or the base station. The operation that the wireless network control device instructs the base station or the UE to perform, or the information issued by the wireless network control device to the base station or the UE may be encapsulated within the downlink node. Hence, the base station or the UE receiving the message may obtain content carried in the message more conveniently.

Thus, according to a method for performing communications in a wireless SDN in embodiments of the present invention, message content and a message format for performing communications between a wireless network control device of a control plane and a base station as well as a user equipment of a data plane are defined, so that the wireless network control device in the wireless SDN may perform communications with the base station and the user equipment, thereby enhancing feasibility of a wireless SDN architecture.

Figure 3:
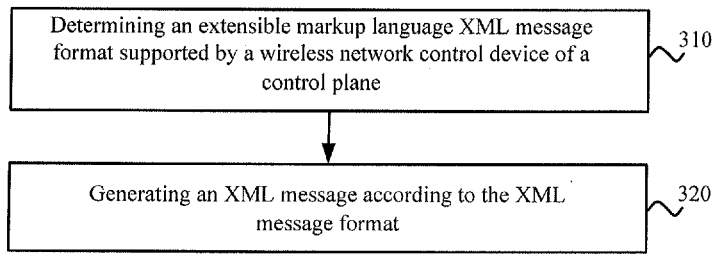
FIG. 3 is a schematic flow chart of a method for performing communications in a wireless SDN according to still another embodiment of the present invention.

FIG. 3 is a schematic flow chart of a method 300 for performing communications in a wireless SDN according to still another embodiment of the present invention, the method may be performed by any proper apparatus in a wireless SDN, for instance, may be performed by a UE, or performed by a base station, or performed by a wireless network control device, but embodiments of the present invention are not limited thereto. As shown in FIG. 3, the method 300 includes:

S310, determining an extensible markup language XML message format supported by a wireless network control device of a control plane;

S320, generating an XML message according to the XML message format.

Thus, according to the method for performing communications in the wireless SDN in the embodiment of the present invention, message content and a message format for performing communications between the wireless network control device of the control plane and a base station as well as a user equipment of a data plane are defined, so that the wireless network control device in the wireless SDN may perform communications with the base station and the user equipment, thereby enhancing feasibility of a wireless SDN architecture.

Optionally, the XML message format may include a root node, a head node and a body node; the head node includes a version element and a message type element, where the version element indicates a protocol version of the message, and the message type element indicates a type of the message; the body node includes content corresponding to the type of the message.

Optionally, the body node includes an uplink node and a downlink node, the uplink node indicates that the XML message is a message transmitted by a user equipment or a base station to the wireless network control device, and the downlink node indicates that the XML message is a message transmitted by the wireless network control device to the UE or the base station.

Optionally, the uplink node includes information reported by the UE to the wireless network control device, information reported by the base station to the wireless network control device, and control information performed by the UE to the wireless network control device;

The downlink node includes control information performed by the wireless network control device to the base station, control information performed by the wireless network control device to the UE, information issued by the wireless network control device to the base station and information issued by the wireless network control device to the UE.

Optionally, as another embodiment, the body node may directly include information reported by the UE to the wireless network control device, information reported by the base station to the wireless network control device, control information performed by the UE to the wireless network control device, control information performed by the wireless network control device to the base station, control information performed by the wireless network control device to the UE, information issued by the wireless network control device to the base station and information issued by the wireless network control device to the UE, but embodiments of the present invention are not limited thereto.

Thus, according to the method for performing communications in the wireless SDN in the embodiment of the present invention, message content and a message format for performing communications between a wireless network control device of a control plane and a base station as well as a user equipment of a data plane are defined, so that the wireless network control device in the wireless SDN may perform communications with the base station and the user equipment, thereby enhancing feasibility of a wireless SDN architecture.

Figure 4:
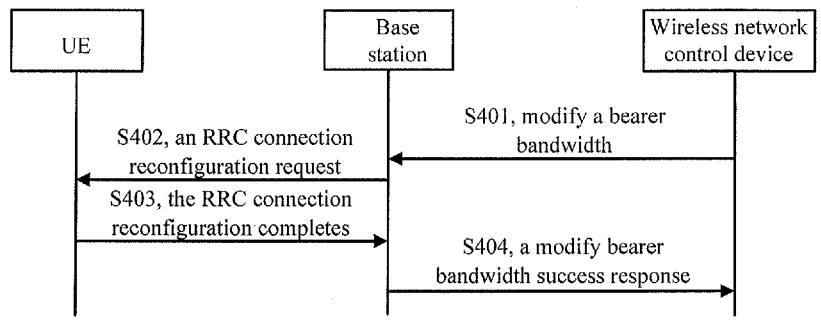
FIG. 4 is a schematic flow chart of a process for modifying a bearer bandwidth in a wireless SDN according to an embodiment of the present invention.

A method for performing communications in a wireless SDN according to embodiments of the present invention will be described hereafter more detailedly with reference to specific examples. FIG. 4 is a schematic flow chart of a process 400 for modifying a bearer bandwidth in a wireless SDN according to an embodiment of the present invention, the process 400 includes:

S401, a wireless network control device transmits a modify bearer bandwidth control message to a base station, and instructs the base station to modify a bearer bandwidth of a UE.

After receiving a request message for modifying a UE bearer bandwidth transmitted by the UE or other monitoring devices, the wireless network control device of the control plane may transmit to the base station the modify bearer bandwidth control message, which may carry an identifier of the UE, and may also carry modified bandwidth information or a bearer identifier and modified bearer bandwidth information, optionally, the modify bearer bandwidth control message may also further include charging information, embodiments of the present invention are not limited thereto.

The modify bearer bandwidth control message may include a root node <root>, a head node <head> and a body node <body>, optionally, the head node may further include a <version>1.1</version> element which is used to indicate that a protocol version of the message is an 1.1 version and <Message type>0</Message type> which is used to indicate that the message is a modify bearer bandwidth control message; optionally, the body node may further include a downlink node <downlink> to indicate that the message is a downlink message, that is, a message transmitted by the wireless network control device to the base station or the UE, where, the downlink node may also further include a <modify_UEbearer> node which is used to instruct the base station to modify a UE bearer bandwidth and a <modify_Charge> node which is used to instruct the base station to modify a charging rate of the UE, optionally, the <modify_UEbearer> node may also further include a <UEID>13512345678</UEID> element which is used to indicate an identification of the UE that needs to modify a bearer, a <BearerID>2</BearerID> element which is used to indicate an identification of the bearer need to be modified and a <TargetBearerNumber>12M</TargetBearerNumber> element which is used to indicate a target bandwidth value of the modified bearer; optionally, the <modify_UEbearer> node may also further include a <ChargeRate>5 yuan/hour </ChargeRate> element which is used to indicate a charging rate of the UE. Optionally, the modify bearer bandwidth control message may also include other nodes and elements to instruct the base station to execute other related operations, but embodiments of the present invention are not limited thereto.

S402, the base station transmits a radio resource control RRC connection reconfiguration request to the UP according to the modify bearer bandwidth control message.

After receiving the RRC connection reconfiguration request, the UP performs an RRC connection reconfiguration with the base station, and when the RRC connection reconfiguration is successful, the UE transmits an RRC connection reconfiguration success response to the base station.

S403, the UE transmits the RRC connection reconfiguration success response to the base station.

S404, the base station transmits a modify bearer bandwidth success response message to the wireless network control device.

The response message may include a root node <root>, a head node <head> and a body node <body>, optionally, the head node may also further include a <version>1.1</version> element which is used to indicate that a protocol version of the message is an 1.1 version and a <Messagetype>20</Messagetype> element which is used to indicate that the message is the modify bearer bandwidth success response message; optionally; the body node may also further include an uplink node <uplink> to indicate that the message is an uplink message, that is, a message transmitted by the base station or the UE to the wireless network control device, where, the uplink node may also further include a <modify_UEbearer> node which is used to instruct to report information of modifying the bearer bandwidth, and the <modify_UEbearer> node may also include a <MessageStatus>0</MessageStatus> element which is used to indicate that the bearer bandwidth is modified successfully, but embodiments of the present invention are not limited thereto.

Figure 5:
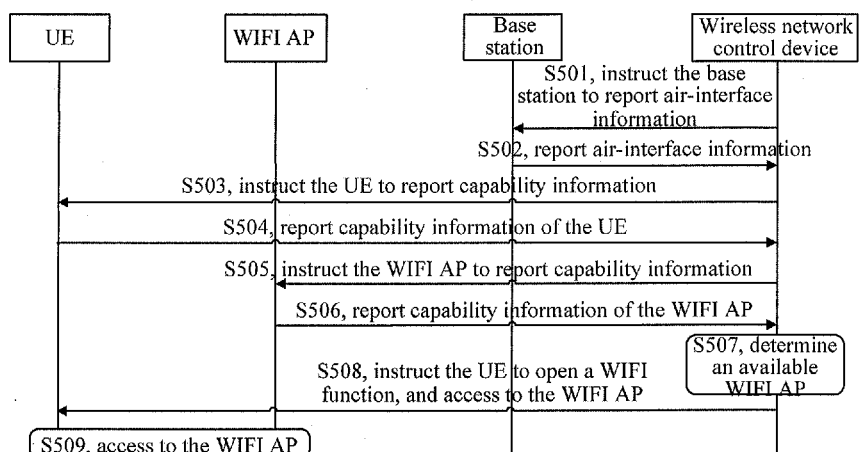
FIG. 5 is a schematic flow chart of a process for modifying a bearer bandwidth in a wireless SDN according to another embodiment of the present invention.

FIG. 5 is a schematic flow chart of a process 500 for modifying a bearer bandwidth in a wireless SDN according to another embodiment of the present invention, the process 500 includes:

S501, a wireless network control device transmits a control message to a base station to instruct the base station to report air-interface information.

The control message transmitted by the wireless network control device of the control plane may include a root node <root>, a head node <head> and a body node <body>, optionally, the head node may further include a <version>1.1</version> element which is used to indicate that a protocol version of the message is an 1.1 version and a <Message type>3</Message type> element which is used to indicate that the message is a message instructing the base station to report surrounding wireless environment; optionally, the body node may further include a downlink node <downlink> to indicate that the message is a downlink message, where, the downlink node may also further include a <ReportInformation> node which is used to instruct the base station to report information; optionally, the <ReportInformation> node may also further include a <BSLoad>-1</BSLoad> element which is used to instruct to report load information of the base station, a <BSLocation>-1</BSLocation> element which is used to instruct to report location information of the base station and an <APLocation>-1</APLocation> element which is used to instruct to report location information of an AP near the base station, optionally, the <ReportInformation> node may also include other nodes and elements to instruct the base station to report other information, embodiments of the present invention are not limited thereto.

S502, the base station transmits a wireless environment reporting message to the wireless network control device report the air-interface information of the base station.

The wireless environment reporting message may include a root node <root>, a head node <head> and a body node <body>, optionally, the head node may further include a <version>1.1</version> element which is used to indicate that a protocol version of the message is an 1.1 version and a <Message type>4</Message type> element which is used to indicate that the message is a message for reporting surrounding wireless environment; optionally, the body node may further include an uplink node <uplink> to indicate that the message is an uplink message, where, the uplink node may also further include a <CellWirelessEnvironment_report> node which is used to indicate to report the wireless environment of the base station, the node may also further include a <BSLoad>0.88</BSLoad> element which is used to report load information of the base station, a <BSLocation>12.0, 2.35</BSLocation> element which is used to report location information of the base station and an <APLocation>11.0, 2.5</APLocation> element which is used to report the location information of the AP near the base station, where, the location information of the base station and the AP may be indicated using longitude and latitude information, optionally, the reporting message may include location information of a plurality of APs near the base station, and the location information of the base station and the APs may also be indicated in other manners, embodiments of the present invention are not limited thereto.

S503, the wireless network control device transmits a first capability reporting message to a UE to instruct the UE to report capability information of the UE.

The first capability reporting message may include a root node <root>, a head node <head> and a body node <body>, optionally, the head node may further include a <version>1.1</version> element which is used to indicate that a protocol version of the message is an 1.1 version and a <Message type>5</Message type> element which is used to indicate that the message is a message for reporting surrounding wireless environment; optionally, the body node may also further include a downlink node <downlink> to indicate that the message is a downlink message, where, the downlink node may also further include a <ReportInformation> node which is used to instruct to report information; optionally, the <ReportInformation> node may also further include a <UECapability_report> node which is used to instruct to report capability information of the UE; optionally, the <UECapability_report> node may include a <UERATControl>-1</UERATControl> element which is used to instruct to report multi-standard control information of the UE, optionally, the <ReportInformation> node and the <UECapability_report> node may also include other nodes and elements to instruct the UE to report other capability information of the UE, embodiments of the present invention are not limited thereto.

S504, the UE transmits a first capability reporting message to the wireless network control device to report the capability information of the UE.

The first capability reporting message may include a root node <root>, a head node <head> and a body node <body>, optionally, the head node may further include a <version>1.1</version> element which is used to indicate that a protocol version of the message is an 1.1 version and a <Message type>6</Message type> element which is used to indicate that the message is a message for reporting capability information of the UE; optionally, the body node may include a <ReportInformation> node, the <ReportInformation> node may further include a <UECapability_report> node, the <UECapability_report> node may also further include a <UERATControl> GSM, UMTS, WIFI, LTE </UERATControl> element to indicate that the UE supports wireless network standards of a GSM, a UMTS, WIFI and an LTE, optionally, the UE may also support other wireless network standards or supports at least one standard of the above wireless network standards, embodiments of the present invention are not limited thereto.

S505, the wireless network control device transmits a second capability reporting message to a WIFI AP to instruct the WIFI AP to report capability information.

The wireless network control device learns from the first capability reporting message transmitted by the UE that the UE supports WIFI, and the wireless network control device learns information of at least one WIFI AP surrounding the base station according to the wireless environment reporting message transmitted by the base station, optionally, the wireless network control device transmits the second capability reporting message to one or a plurality of WIFI APs in at least one WIFI AP reported by the base station, to instruct the WIFI AP to report capability information.

The second capability reporting message may include a root node <root>, a head node <head> and a body node <body>, optionally, the head node may further include a <version>1.1</version> element which is used to indicate that a protocol version of the message is an 1.1 version and a <Message type>7</Message type> element which is used to indicate that the message is a message for instructing an AP to report capability information; optionally, the body node may include a <ReportInformation> node, the <ReportInformation> node may further include an <APCapability_report> node which is used to instruct the AP to report capability information, the <APCapability_report> node may also further include an <APLoad>-1</APLoad> element which is used to instruct the AP to report load information and an <APAvailableBandwidth>-1<APAvailableBandwidth> element which is used to instruct the AP to report available bandwidth information, optionally, the <APCapability_report> node may also include other nodes and elements to instruct the AP to report other capability information, embodiments of the present invention are not limited thereto.

S506, the WIFI AP transmits a second capability reporting message to the wireless network control device to report capability information of the WIFI AP.

One or a plurality of WIFI APs receiving the second capability reporting message transmitted by the wireless network control device report capability information thereof according to indication information in the second capability reporting message respectively.

The second capability reporting message may include a root node <root>, a head node <head> and a body node <body>, optionally, the head node may further include a <version>1.1</version> element which is used to indicate that a protocol version of the message is an 1.1 version and a <Message type>8</Message type> element which is used to indicate that the message is a message reporting capability information of an AP; optionally, the body node may include an <APLoad>0.55</APLoad> element which is used to report load information of the AP and an <APAvailableBandwidth>25M/s<APAvailableBandwidth> element which is used to report available bandwidth information of the AP.

S507, the wireless network control device determines an available WIFI AP.

According to the second capability reporting message transmitted by the one or the plurality of WIFI APs, the wireless network control device selects a WIFI AP available for the UE from the one or the plurality of WIFI APs, where, sum of an available bandwidth of the available WIFI AP and a bandwidth of the base station should be able to support a service bandwidth required by the UE.

S508, the wireless network control device transmits a multi-standard control message to the UE to instruct the UE to open a WIFI function and access to the WIFI AP.

The multi-standard control message may include a root node <root>, a head node <head> and a body node <body>, optionally, the head node may further include a <version>1.1</version> element which is used to indicate that a protocol version of the message is an 1.1 version and a <Message type>9</Message type> element which is used to indicate that the message is a multi-standard control message; optionally, the body node may include a <UERATControl>1</UERATControl> element which is used to instruct the UE to open WIFI and a <WIFI> node which is used to instruct the UE to access to a specified AP, the <WIFI> node may further include a <WIFIAPID>256</WIFIAPID> element which is used to indicate an identification of an AP accessed by the UE and an <SSID>12358966</SSID> element which is used to indicate a service set identifier (Service Set Identifier, "SSID" for short) of the AP accessed by the UE, optionally, the body node may not include the <UERATControl>1</UERATControl> element, instead the <WIFI> node instructs the UE to open WIFI and access to the specified AP, embodiments of the present invention are not limited thereto.

S509, the UE accesses to the WIFI AP according to the multi-standard control message.

The UE may access to an AP corresponding to the identification according to the identification of the WIFI AP and the SSID in the multi-standard control message. After accessing to the WIFI AP successfully, the wireless network control device may instruct the base station and the WIFI to shunt service traffic of the UE, but embodiments of the present invention are not limited thereto.

It should be noted that examples of FIG. 4 and FIG. 5 direct at helping persons skilled in the art with better understanding of embodiments of the present invention, rather than limiting the scope of embodiments of the present invention. Obviously, persons skilled in the art may make equivalent modifications or variations according to the examples of FIG. 4 and FIG. 5 as shown, and such modifications or variations also fall into the scope of the embodiments of the present invention.

The contexts above describe in detail about a method for performing communication in a wireless SDN according to embodiments of the present invention with reference to FIG. 1~FIG. 5, and a base station or a user equipment UE, a wireless network control device and a communication apparatus according to embodiments of the present invention will be described in detail hereafter with reference to FIG. 6~FIG. 11.

Figure 6:
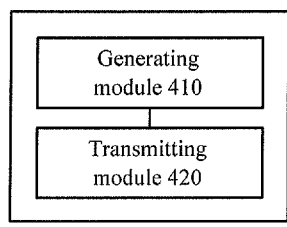
FIG. 6 is a schematic block diagram of a base station or a user equipment according to an embodiment of the present invention.

FIG. 6 is a schematic block diagram of a base station 400 or a user equipment UE 400 according to an embodiment of the present invention, as shown in FIG. 6, the base station 400 or the UE 400 includes:

a generating module 410, configured to generate a message in a first format; and a transmitting module 420, configured to transmit the message generated by the generating module 410 to a wireless network control device of a control plane, so that the wireless network control device obtains content in the message according to the first format.

Thus, a base station or a UE of a data plane in embodiments of the present invention defines message content and a message format for performing communications with a wireless network control device of a control plane, so that the base station as well as the UE may perform communications with the wireless network control device in the wireless SDN, thereby enhancing feasibility of a wireless SDN architecture.

Optionally, the first format is an extensible markup language XML format.

Optionally, when the first format is the XML format, the message includes a head node and a body node; the head node includes a version element and a message type element, where the version element indicates a protocol version of the message, and the message type element indicates a type of the message; the body node includes the content corresponding to the type of the message.

Optionally, the content includes information reported by the UE or the base station to the wireless network control device, or an operation that the UE requests the wireless network control device to perform.

Optionally, as another embodiment, the information reported by the base station to the wireless network control device includes at least one of the followings: cell establishment information, cell delete information, cell activation information, cell deactivation information, cell load information, cell serving UE list information, base station surrounding wireless environment information and cell traffic information.

Optionally, as another embodiment, the information reported by the UE to the wireless network control device includes at least one of the followings: access information of the UE, delete bearer information of the UE, channel quality information of the UE, capability information of the UE, location information of the UE and quality of service Qos information of the UE.

The operation that the UE requests the wireless network control device to perform includes at least one of the following operations: modifying a service bandwidth of the UE and modifying a service delay of the UE.

Optionally, as another embodiment, the body node includes an uplink node, and the uplink node indicates that the message is a message transmitted by the user equipment or the base station to the wireless network control device.

It should be understood that, the base station 400 or the UE 400 according to embodiments of the present invention can correspond to a base station or a UE in embodiments of the present invention respectively, and the above and other operations and/or functions of respective modules in the base station 400 or the UE 400 aim to implement a corresponding process of each of methods in FIG. 1~FIG. 5 respectively, which will not be repeated herein for the sake of concision.

Thus, the base station or the UE in the embodiment of the present invention defines message content and a message format for performing communications with a wireless network control device, so that the base station as well as the UE may perform communications with the wireless network control device in the wireless SDN, thereby enhancing feasibility of a wireless SDN architecture.

Figure 7:
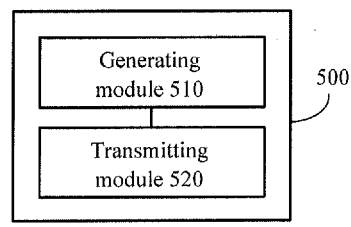
FIG. 7 is a schematic block diagram of a wireless network control device of a control plane according to an embodiment of the present invention.

FIG. 7 is a schematic block diagram of a wireless network control device 500 of a control plane according to an embodiment of the present invention, as shown in FIG. 7, the wireless network control device 500 includes:

a generating module 510, configured to generate a message in a first format; and a transmitting module 520, configured to transmit the message generated by the generating module 510 to a user equipment UE or a base station, so that the UE or the base station obtains content in the message according to the first format.

Thus, the wireless network control device of the control plane in the embodiment of the present invention defines message content and a message format for performing communications with a base station and a user equipment UE of a data plane, so that the wireless network control device may perform communications with the base station as well as the UE in the wireless SDN, thereby enhancing feasibility of a wireless SDN architecture.

Optionally, the first format is an extensible markup language XML format.

Optionally, when the first format is the XML format, the message includes a head node and a body node; the head node includes a version element and a message type element, where the version element indicates a protocol version of the message, and the message type element indicates a type of the message; the body node includes the content corresponding to the type of the message.

Optionally, the content includes an operation that the wireless network control device instructs the UE or instructs the base station to perform, or includes information issued by the wireless network control device to the UE or the base station.

Optionally, as another embodiment, the operation that the wireless network control device instructs the base station to perform includes at least one of the following operations: quality of service Qos priority control, service bandwidth control, service delay control, access control, mobility control, multi-standard offload control, cell handover control, scheduling priority control, UE service charging control, use spectral control by the base station and virtualization;

The operation that the wireless network control device instructs the UE to perform includes at least one of the following operations: multi-standard access control, handover control, offload control and virtualization.

Optionally, as another embodiment, the information issued by the wireless network control device to the base station includes at least one of the followings: location information of other base station or radio access point AP surrounding the base station, load information of other base station or radio AP surrounding the base station, wireless environment available white spectrum resource information and load information of the wireless network control device;

The information issued by the wireless network control device to the UE includes at least one of the followings: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

Optionally, as another embodiment, the body node includes a downlink node, and the downlink node indicates that the message is a message transmitted by the wireless network control device to the UE or the base station.

It should be understood that, the wireless network control device 500 according to embodiments of the present invention can correspond to a wireless network control device in embodiments of the present invention, and the above and other operations and/or functions of respective modules in the wireless network control device 500 aim to implement a corresponding process of each of methods in FIG. 2~FIG. 5 respectively, which will not be repeated herein for the sake of concision.

Thus, the wireless network control device of the control plane in the embodiment of the present invention defines message content and a message format for performing communications with a base station and a user equipment UE of a data plane, so that the wireless network control device may perform communications with the base station as well as the UE in the wireless SDN, thereby enhancing feasibility of a wireless SDN architecture.

FIG. 8 is a schematic block diagram of a communication apparatus 600 according to an embodiment of the present invention, where the communication apparatus may be a UE, a base station or a wireless network control device of a control plane, as shown in FIG. 8, the communication apparatus 600 includes:

a determining module 610, configured to determine an extensible markup language XML message format supported by the wireless network control device of the control plane; and a generating module 620, configured to generate an XML message according to the XML message format determined by the determining module 610.

Thus, the communication apparatus in the embodiment of the present invention defines message content and a message format for performing communications with other devices in a wireless SDN, so that the communication apparatus may perform communications with other devices in the wireless SDN, thereby enhancing feasibility of a wireless SDN architecture.

Optionally, the XML message format includes a root node, a head node and a body node; the head node includes a version element and a message type element, where the version element indicates a protocol version of the message, and the message type element indicates a type of the message; the body node includes content corresponding to the type of the message.

Optionally, as another embodiment, the body node includes an uplink node and a downlink node, the uplink node indicates that the XML message is a message transmitted by the user equipment or the base station to the wireless network control device, and the downlink node indicates that the XML message is a message transmitted by the wireless network control device to the UE or the base station.

Optionally, as another embodiment, the uplink node includes information reported by the UE to the wireless network control device, information reported by the base station to the wireless network control device, and control information performed by the UE to the wireless network control device;

The downlink node includes control information performed by the wireless network control device to the base station, control information performed by the wireless network control device to the UE, information issued by the wireless network control device to the base station and information issued by the wireless network control device to the UE.

It should be understood that, the communication apparatus 600 according to embodiments of the present invention can correspond to a base station, a UE or a wireless network control device in embodiments of the present invention, and the above and other operations and/or functions of respective modules in the communication apparatus 600 aim to implement a corresponding process of each of methods in FIG. 1~FIG. 5 respectively, which will not be repeated herein for the sake of concision.

Thus, the communication apparatus in the embodiment of the present invention defines message content and a message format for performing communications with other devices in a wireless SDN, so that the communication apparatus may perform communications with other devices in the wireless SDN, thereby enhancing feasibility of a wireless SDN architecture.

FIG. 9 is a schematic block diagram of a base station 700 or a user equipment UE 700 according to another embodiment of the present invention, as shown in FIG. 9, the base station 700 or the UE 700 includes:

a processor 710, configured to generate a message in a first format; and a transmitter 720, configured to transmit the message generated by the processor 710 to a wireless network control device of a control plane, so that the wireless network control device obtains content in the message according to the first format.

Thus, a base station or a UE of a data plane in the embodiment of the present invention defines message content and a message format for performing communications with a wireless network control device of a control plane, so that the base station as well as the UE may perform communications with the wireless network control device in the wireless SDN, thereby enhancing feasibility of a wireless SDN architecture.

Optionally, the first format is an extensible markup language XML format.

Optionally, when the first format is the XML format, the message includes a head node and a body node; the head node includes a version element and a message type element, where the version element indicates a protocol version of the message, and the message type element indicates a type of the message; the body node includes the content corresponding to the type of the message.

Optionally, the content includes information reported by the UE or the base station to the wireless network control device, or an operation that the UE requests the wireless network control device to perform.

Optionally, as another embodiment, the information reported by the base station, to the wireless network control device includes at least one of the followings: cell establishment information, cell delete information, cell activation information, cell deactivation information, cell load information, cell serving UE list information, base station surrounding wireless environment information and cell traffic information.

Optionally, as another embodiment, the information reported by the UE to the wireless network control device includes at least one of the followings: access information of the UE, delete bearer information of the UE, channel quality information of the UE, capability information of the UE, location information of the UE and quality of service Qos information of the UE.

The operation that the UE requests the wireless network control device to perform includes at least one of the following operations: modifying a service bandwidth of the UE and modifying a service delay of the UE.

Optionally, as another embodiment, the body node includes an uplink node, and the uplink node indicates that the message is a message transmitted by the user equipment or the base station to the wireless network control device.

It should be understood that, the base station 700 or the UE 700 according to embodiments of the present invention can correspond to a base station or a UE in embodiments of the present invention respectively, and the above and other operations and/or functions of respective modules in the base station 700 or the UE 700 aim to implement a corresponding process of each of methods in FIG. 1~FIG. 5 respectively, which will not be repeated herein for the sake of concision.

Thus, a base station or a UE of a data plane in embodiments of the present invention defines message content and a message format for performing communications with a wireless network control device of a control plane, so that the base station as well as the UE may perform communications with the wireless network control device in the wireless SDN, thereby enhancing feasibility of a wireless SDN architecture.

FIG. 10 is a schematic block diagram of a wireless network control device 800 of a control plane according to another embodiment of the present invention, as shown in FIG. 10, the wireless network control device 800 includes:

a processor 810, configured to generate a message in a first format; and a transmitter 820, configured to transmit the message generated by the processor 810 to a user equipment UE or a base station, so that the UE or the base station obtains content in the message according to the first format.

Thus, the wireless network control device of the control plane in the embodiment of the present invention defines message content and a message format for performing communications with a base station and a user equipment UE of a data plane, so that the wireless network control device may perform communications with the base station as well as the UE in the wireless SDN, thereby enhancing feasibility of a wireless SDN architecture.

Optionally, the first format is an extensible markup language XML format.

Optionally, when the first format is the XML format, the message includes a head node and a body node; the head node includes a version element and a message type element, where the version element indicates a protocol version of the message, and the message type element indicates a type of the message; the body node includes the content corresponding to the type of the message.

Optionally, the content includes an operation that the wireless network control device instructs the UE or instructs the base station to perform, or includes information issued by the wireless network control device to the UE or the base station.

Optionally, as another embodiment, the operation that the wireless network control device instructs the base station to perform includes at least one of the following operations: quality of service Qos priority control, service bandwidth control, service delay control, access control, mobility control, multi-standard offload control, cell handover control, scheduling priority control, UE service charging control, use spectral control by the base station and virtualization;

The operation that the wireless network control device instructs the UE to perform includes at least one of the following operations: multi-standard access control, handover control, offload control and virtualization.

Optionally, as another embodiment, the information issued by the wireless network control device to the base station includes at least one of the followings: location information of other base station or radio access point AP surrounding the base station, load information of other base station or radio AP surrounding the base station, wireless environment available white spectrum resource information and load information of the wireless network control device;

The information issued by the wireless network control device to the UE includes at least one of the followings: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

Optionally, as another embodiment, the body node includes a downlink node, and the downlink node indicates that the message is a message transmitted by the wireless network control device to the UE or the base station.

It should be understood that, the wireless network control device 800 according to embodiments of the present invention can correspond to a wireless network control device in embodiments of the present invention, and the above and other operations and/or functions of respective modules in the wireless network control device 800 aim to implement a corresponding process of each of methods in FIG. 2~FIG. 5 respectively, which will not be repeated herein for the sake of concision.

Thus, the wireless network control device of the control plane in the embodiment of the present invention defines message content and a message format for performing communications with a base station and a user equipment UE of a data plane, so that the wireless network control device may perform communications with the base station as well as the UE in the wireless SDN, thereby enhancing feasibility of a wireless SDN architecture.

FIG. 11 is a schematic block diagram of a communication apparatus 900 according to another embodiment of the present invention, as shown in FIG. 11, the communication apparatus 900 includes a memory 910 and a processor 920, where the processor 920 is configured to execute instructions stored by the memory 910, specifically, the processor 920 is configured to determine an extensible markup language XML message format supported by a wireless network control device of a control plane, and generate an XML message according to the XML message format.

Thus, the communication apparatus in the embodiment of the present invention defines message content and a message format for performing communications with other devices in a wireless SDN, so that the communication apparatus may perform communications with other devices in the wireless SDN, thereby enhancing feasibility of a wireless SDN architecture.

Optionally, the XML message format includes a root node, a head node and a body node; the head node includes a version element and a message type element, where the version element indicates a protocol version of the message, and the message type element indicates a type of the message; the body node includes content corresponding to the type of the message.

Optionally, as another embodiment, the body node includes an uplink node and a downlink node, the uplink node indicates that the XML message is a message transmitted by the user equipment or the base station to the wireless network control device, and the downlink node indicates that the XML message is a message transmitted by the wireless network control device to the UE or the base station.

Optionally, as another embodiment, the uplink node includes information reported by the UE to the wireless network control device, information reported by the base station to the wireless network control device, and control information performed by the UE to the wireless network control device;

The downlink node includes control information performed by the wireless network control device to the base station, control information performed by the wireless network control device to the UE, information issued by the wireless network control device to the base station and information issued by the wireless network control device to the UE.

It should be understood that, the communication apparatus 900 according to embodiments of the present invention can correspond to a base station, a UE or a wireless network control device in embodiments of the present invention, and the above and other operations and/or functions of respective modules in the communication apparatus 900 aim to implement a corresponding process of each of methods in FIG. 1~FIG. 5 respectively, which will not be repeated herein for the sake of concision.

Thus, the communication apparatus in the embodiment of the present invention defines message content and a message format for performing communications with other devices in a wireless SDN, so that the communication apparatus may perform communications with other devices in the wireless SDN, thereby enhancing feasibility of a wireless SDN architecture.

It should be understood that, in embodiments of the present invention, the term "and/or" is just a association relationship for describing associated objects, which indicates that there may be three relationships. For example, A and/or B may indicate three cases: there is A alone, there are both A and B, and there is B alone. In addition, the character "/" in the contexts generally indicates that there is an "or" relationship between consecutive associated objects.

It can be realized by persons of ordinary skill in the art that, the units and the method steps that are described with reference to the embodiments disclosed herein may be implemented by electronic hardware, computer software, or a combination of electronic hardware and computer software. In order to clearly describe the interchangeability of the hardware and the software, the constitution and the steps of each embodiment have been generally described according to the functions in the foregoing description. The situation that these functions are performed by hardware or software depends on a specific application and design constraint of the technical solutions. Persons skilled in the art may implement the described functions by using different methods for each specific application, but such implementation should not be regarded as going beyond the scope of the present invention.

It can be clearly known by persons skilled in the art that, for the purpose of convenient and brief description, reference may be made to a corresponding process in the foregoing method embodiments for a detailed operating process of the foregoing system, apparatus and unit, which will not be repeated herein.

In several embodiments provided in the present application, it should be understood that the disclosed system, apparatus, and method may be implemented in other manners. For example, the described apparatus embodiment is merely exemplary. For example, the unit division is merely a logical function division and there may be other divisions during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions in embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium capable of storing program codes, such as a USB flash disk, a mobile hard disk, a read-only memory (Read-Only Memory, "ROM" for short), a random access memory (Random Access Memory, "RAM" for short), a magnetic disk, or an optical disc.

The above descriptions are merely specific implementations of the present invention, but the protection scope of the present invention is not limited thereto. Persons skilled in the art may readily envisage of equivalent modifications or replacements within the technical scope disclosed in the present invention, these modifications or replacements should fall within the protection scope of the present invention. Thus, the protection scope of the present invention should be subject to the claims.

What is claimed is:

1. A method for performing communications in a wireless software defined network (SDN), comprising:
    determining, by pre-negotiation between a base station of a data plane or a user equipment (UE) of the data plane and a wireless network control device of a control plane, a first format for messages;
    generating, by the base station of the data plane or the UE of the data plane, a message in the first format, wherein, the message comprises a head node and a body node; the head node comprises a version element and a message type element, wherein the version element indicates a protocol version of the message, and the message type element indicates a type of the message; the body node comprises the content corresponding to the type of the message; and
    transmitting, by the base station or the UE, the message to a wireless network control device of the control plane via a wireless air interface between the base station or the UE and the wireless network control device, so that the wireless network control device obtains content in the message according to the first format.

2. The method according to claim 1, wherein, the first format is an extensible markup language (XML) format.

3. The method according to claim 1, wherein, the content comprises information reported by the UE or the base station to the wireless network control device, or an operation that the UE requests the wireless network control device to perform.

4. The method according to claim 3, wherein, the information reported by the base station to the wireless network control device comprises at least one of the following: cell establishment information, cell delete information, cell activation information, cell deactivation information, cell load information, cell serving UE list information, base station surrounding wireless environment information and cell traffic information.

5. The method according to claim 3, wherein, the information reported by the UE to the wireless network control device comprises at least one of the following: access information of the UE, delete bearer information of the UE, channel quality information of the UE, capability information of the UE, location information of the UE and quality of service Qos information of the UE;
    the operation that the UE requests the wireless network control device to perform comprises at least one of the following operations: modifying a service bandwidth of the UE and modifying a service delay of the UE.

6. The method according to claim 1, wherein, the body node comprises an uplink node, and the uplink node indicates that the message is a message transmitted by the UE or the base station to the wireless network control device.

7. A method for performing communications in a wireless software defined network (SDN), comprising:
   determining, by pre-negotiation between a base station of a data plane or a user equipment (UE) of the data plane and a wireless network control device of a control plane, a first format for messages;
   generating, by the wireless network control device of the control plane, a message in the first format, wherein, the message comprises a head node and a body node; the head node comprises a version element and a message type element, wherein the version element indicates a protocol version of the message, and the message type element indicates a type of the message; the body node comprises the content corresponding to the type of the message; and
   transmitting, by the wireless network control device, the message to the UE of the data plane or the base station of the data plane via a wireless air interface between the base station or the UE and the wireless network control device, so that the UE or the base station obtains content in the message according to the first format.

8. The method according to claim 7, wherein, the first format is an extensible markup language (XML) format.

9. The method according to claim 7, wherein, the content comprises an operation that the wireless network control device instructs the UE or instructs the base station to perform, or comprises information issued by the wireless network control device to the UE or the base station.

10. The method according to claim 9, wherein, the operation that the wireless network control device instructs the base station to perform comprises at least one of the following operations: quality of service Qos priority control, service bandwidth control, service delay control, access control, mobility control, multi-standard offload control, cell handover control, scheduling priority control, UE service charging control, use spectral control by the base station and virtualization;
   the operation that the wireless network control device instructs the UE to perform comprises at least one of the following operations: multi-standard access control, handover control, offload control and virtualization.

11. The method according to claim 9, wherein, the information issued by the wireless network control device to the base station comprises at least one of the following: location information of other base station or radio access point AP surrounding the base station, load information of other base station or radio AP surrounding the base station, wireless environment available white spectrum resource information and load information of the wireless network control device;
   the information issued by the wireless network control device to the UE comprises at least one of the following: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

12. The method according to claim 7, wherein, the body node comprises a downlink node, and the downlink node indicates that the message is a message transmitted by the wireless network control device to the UE or the base station.

13. A method for performing communications in a wireless software defined network (SDN), comprising:
   determining, by pre-negotiation between a wireless network control device of a control plane and a base station of a data plane or a user equipment (UE) of the data plane, an extensible markup language (XML) message format supported by the wireless network control device, wherein, the XML message format comprises a root node, a head node and a body node; the head node comprises a version element and a message type element, wherein the version element indicates a protocol version of the message, and the message type element indicates a type of the message; the body node comprises content corresponding to the type of the message; and
   generating, by the wireless network control device or the base station or the UE, an XML message according to the XML message format.

14. The method according to claim 13, wherein, the body node comprises an uplink node and a downlink node, the uplink node indicates that the XML message is a message transmitted by the UE or the base station to the wireless network control device, and the downlink node indicates that the XML message is a message transmitted by the wireless network control device to the UE or the base station.

15. The method according to claim 14, wherein, the uplink node comprises information reported by the UE to the wireless network control device, information reported by the base station to the wireless network control device, and control information performed by the UE to the wireless network control device;
   the downlink node comprises control information performed by the wireless network control device to the base station, control information performed by the wireless network control device to the UE, information issued by the wireless network control device to the base station and information issued by the wireless network control device to the UE.

16. A base station of a data plane or a user equipment (UE) of the data plane, comprising:
   a processor and a memory having program instructions stored therein, the program instructions configuring the processor to comprise:
   a generating module, configured to determine, by pre-negotiation between the base station or the UE and a wireless network control device of a control plane, a first format for messages, and to generate a message in the first format, wherein, the message comprises a head node and a body node; the head node comprises a version element and a message type element, wherein the version element indicates a protocol version of the message, and the message type element indicates a type of the message; the body node comprises the content corresponding to the type of the message; and
   a transmitting module, configured to transmit the message generated by the generating module to the wireless network control device of the control plane via a wireless air interface between the base station or the UE and the wireless network control device, so that the wireless network control device obtains content in the message according to the first format.

17. The base station or the UE according to claim 16, wherein, the first format is an extensible markup language (XML) format.

18. The base station or the UE according to claim 16, wherein, the content comprises information reported by the UE or the base station to the wireless network control device, or an operation that the UE requests the wireless network control device to perform.

19. The base station or the UE according to claim 18, wherein, the information reported by the base station to the wireless network control device comprises at least one of the following: cell establishment information, cell delete information, cell activation information, cell deactivation information, cell load information, cell serving UE list information, base station surrounding wireless environment information and cell traffic information.

20. The base station or the UE according to claim 18, wherein, the information reported by the UE to the wireless network control device comprises at least one of the following: access information of the UE, delete bearer information of the UE, channel quality information of the UE, capability information of the UE, location information of the UE and quality of service Qos information of the UE;
the operation that the UE requests the wireless network control device to perform comprises at least one of the following operations: modifying a service bandwidth of the UE and modifying a service delay of the UE.

21. The base station or the UE according to claim 16, wherein, the body node comprises an uplink node, and the uplink node indicates that the message is a message transmitted by the UE or the base station to the wireless network control device.

22. A wireless network control device of a control plane, comprising:
a processor and a memory having program instructions stored therein, the program instructions configuring the processor to comprise:
a generating module, configured to determine, by pre-negotiation between a base station of a data plane or a user equipment (UE) of the data plane and the wireless network control device, a first format for messages, and to generate a message in the first format, wherein, the message comprises a head node and a body node; the head node comprises a version element and a message type element, wherein the version element indicates a protocol version of the message, and the message type element indicates a type of the message; the body node comprises the content corresponding to the type of the message; and
a transmitting module, configured to transmit the message generated by the generating module to the UE of the data plane or the base station of the data plane via a wireless air interface between the base station or the UE and the wireless network control device, so that the UE or the base station obtains content in the message according to the first format.

23. The wireless network control device according to claim 22, wherein, the first format is an extensible markup language (XML) format.

24. The wireless network control device according to claim 22, wherein, the content comprises an operation that the wireless network control device instructs the UE or instructs the base station to perform, or comprises information issued by the wireless network control device to the UE or the base station.

25. The wireless network control device according to claim 24, wherein, the operation that the wireless network control device instructs the base station to perform comprises at least one of the following operations: quality of service Qos priority control, service bandwidth control, service delay control, access control, mobility control, multi-standard offload control, cell handover control, scheduling priority control, UE service charging control, use spectral control by the base station and virtualization;
the operation that the wireless network control device instructs the UE to perform comprises at least one of the following operations: multi-standard access control, handover control, offload control and virtualization.

26. The wireless network control device according to claim 24, wherein, the information issued by the wireless network control device to the base station comprises at least one of the following: location information of other base station or radio access point AP surrounding the base station, load information of other base station or radio AP surrounding the base station, wireless environment available white spectrum resource information and load information of the wireless network control device;
the information issued by the wireless network control device to the UE comprises at least one of the following: distribution information of a radio AP surrounding the UE, load information of the radio AP surrounding the UE, wireless interference information surrounding the UE, distribution information of other UEs surrounding the UE, status information of other UEs surrounding the UE and adjacent cell information.

27. The wireless network control device according to claim 22, wherein, the body node comprises a downlink node, and the downlink node indicates that the message is a message transmitted by the wireless network control device to the UE or the base station.

28. A wireless network control device of a control plane or a base station of a data plane or a user equipment (UE) of the data plane, comprising:
a processor and a memory having program instructions stored therein, the program instructions configuring the processor to comprise:
a determining module, configured to determine, by pre-negotiation between the base station or the UE and the wireless network control device, an extensible markup language (XML) message format supported by a wireless network control device of a control plane, wherein, the XML message format comprises a root node, a head node and a body node; the head node comprises a version element and a message type element, wherein the version element indicates a protocol version of the message, and the message type element indicates a type of the message; the body node comprises content corresponding to the type of the message; and
a generating module, configured to generate an XML message according to the XML message format determined by the determining module.

29. The wireless network control device or the base station or the UE according to claim 28, wherein, the body node comprises an uplink node and a downlink node, the uplink node indicates that the XML message is a message transmitted by the UE or the base station to the wireless network control device, and the downlink node indicates that the XML message is a message transmitted by the wireless network control device to the UE or the base station.

30. The wireless network control device or the base station or the UE according to claim 29, wherein, the uplink node comprises information reported by the UE to the wireless network control device, information reported by the base station to the wireless network control device, and control information performed by the UE to the wireless network control device;

the downlink node comprises control information performed by the wireless network control device to the base station, control information performed by the wireless network control device to the UE, information issued by the wireless network control device to the base station and information issued by the wireless network control device to the UE.

* * * * *